Nov. 19, 1957 H. LAUBE 2,813,452
MOTION PICTURES WITH SYNCHRONIZED ODOR EMISSION
Filed June 24, 1954 3 Sheets-Sheet 1
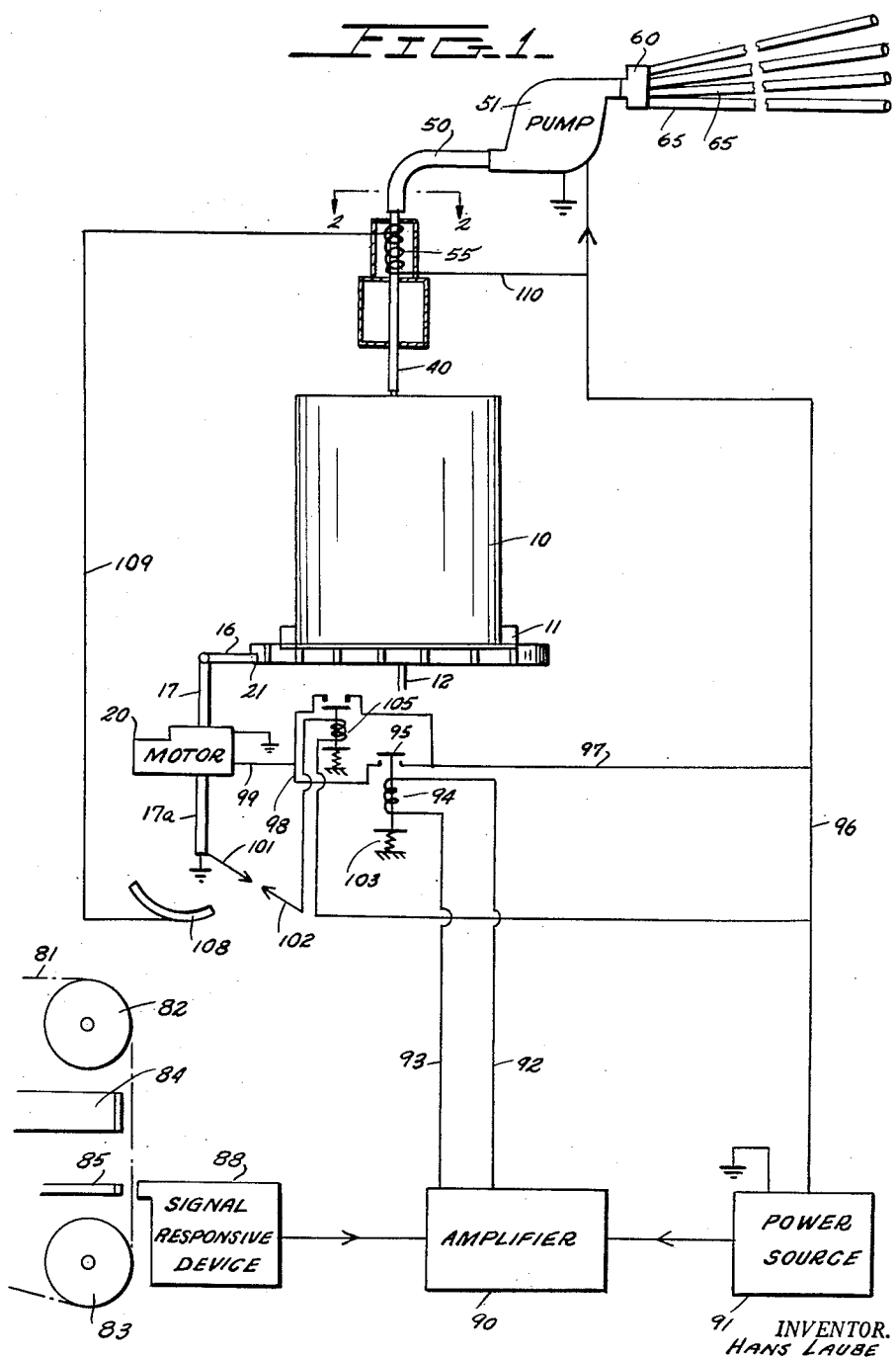

Nov. 19, 1957     H. LAUBE     2,813,452
MOTION PICTURES WITH SYNCHRONIZED ODOR EMISSION
Filed June 24, 1954     3 Sheets-Sheet 2
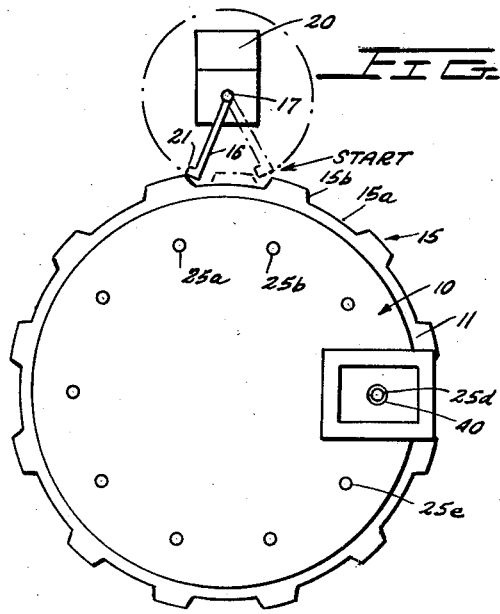
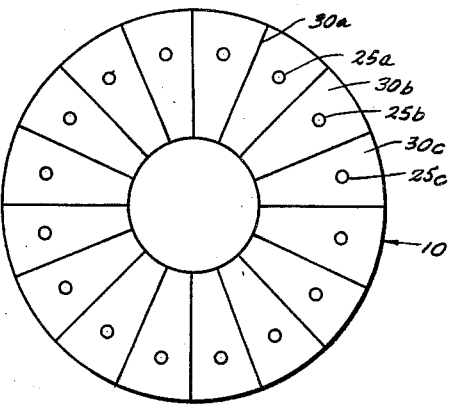
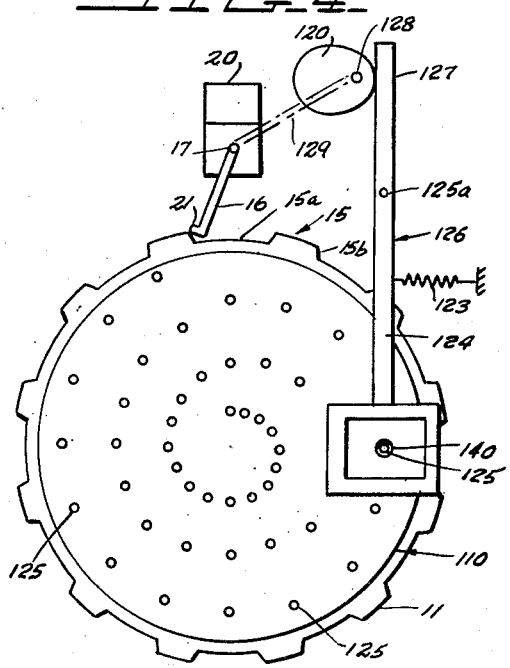
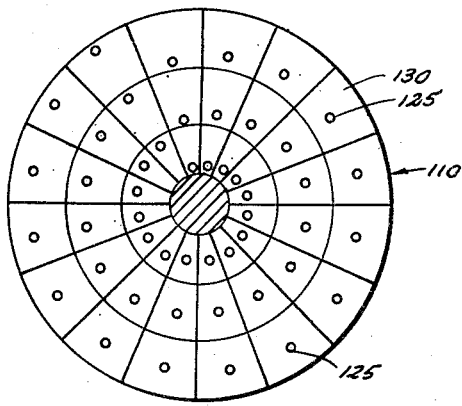
INVENTOR.
HANS LAUBE
BY
Ostrolenk & Faber
ATTORNEYS

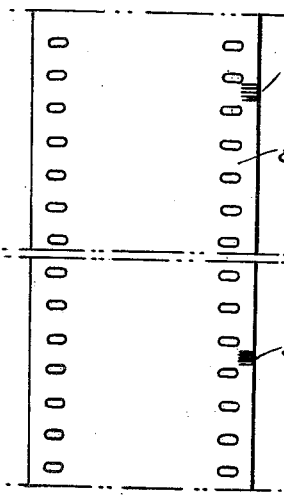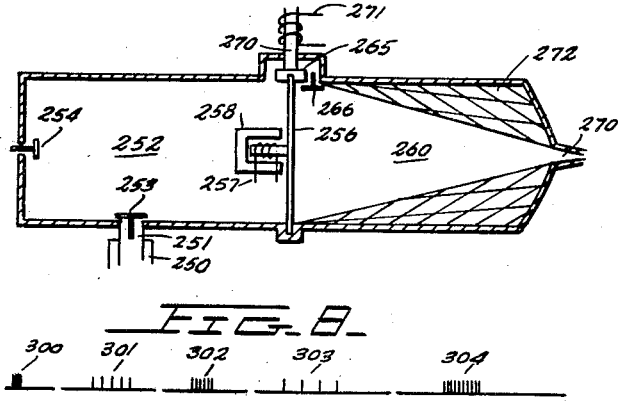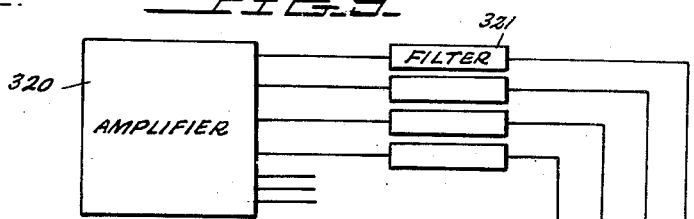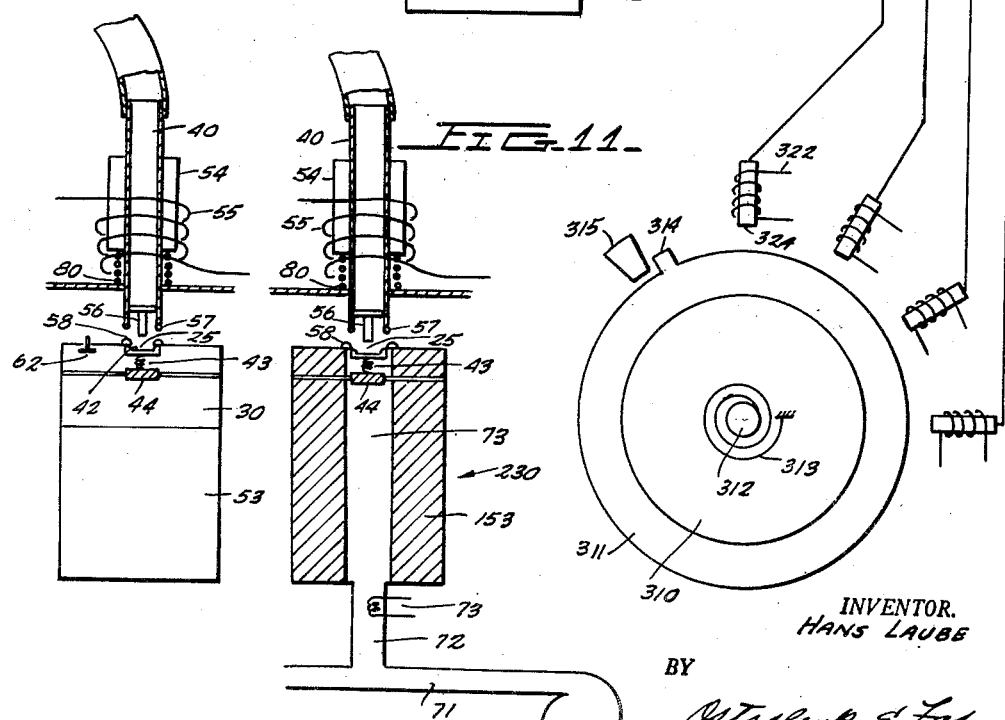

United States Patent Office 2,813,452
Patented Nov. 19, 1957

2,813,452

MOTION PICTURES WITH SYNCHRONIZED ODOR EMISSION

Hans Laube, New York, N. Y., assignor, by mesne assignments, to Hans Laube and Bert S. Good, New York, N. Y.

Application June 24, 1954, Serial No. 439,165

7 Claims. (Cl. 88—16)

My present invention relates to a method for causing emission of appropriate odors in synchronized relation with motion pictures.

While my invention will here be described specifically in connection with motion pictures, it will be obvious from the following description that substantially the same system with obvious modifications can be adapted to transmission or viewing of pictures by systems other than motion pictures, including television, and that the same system, method and apparatus may as readily be adapted to the presentation of sequential scenes, advertising illustrations and other presentations involving a pictorial representation which may be enhanced by an appropriate aroma.

Various attempts have been made to emit odors in synchronism with successive images, but these prior attempts have been uniformly unsuccessful owing first to the failure fully to understand the chemistry of odors and second to the utilization of apparatus which theoretically might be deemed to have had an appropriate function but which in practice did not operate as expected to produce the desired odor emission.

One of the essential elements in the emission of odors sequentially is the processing of the materials and the emission of the various elements so that one odor will disappear substantially instantaneously when it is intended to disappear, and the next odor will become apparent substantially instantaneously when it is intended to become apparent.

For this purpose an essential element of my invention is the utilization of various odors of varying concentrations so that the emission of equal volumes will crease an olfactory sensation of equal intensity and so that the odor will last only as long as desired and be either removed or replaced at the moment desired.

Odors and perfumes which are available commercially are invariably provided with a fixative, that is, the essential oil is placed in a vehicle which will on evaporation permit the volatile substances of the essential oils to become apparent to the olfactory sense. In order to preserve the continuity of odor, a fixative is added to the preparation which, among other purposes, will have the primary function of slowing the volatilization of the essential oil so that the odor will have a prolonged effort.

Thus, when a perfume is sprayed into a room and on the person, it is usually desired that the odor remain for a substantial period of time, hence the requirement of the fixative in commercially available perfumes.

One of the essential elements of my invention is the removal of the fixative or of as substantial a part thereof as can be removed from the perfume prior to its use.

Thus, when the desired odor is sprayed into the viewing area in synchronism with the picture, the odor will remain as long as the volatile essence is forced into the viewing area and will cease to be apparent very rapidly after the spraying operation has stopped.

The volumes and concentrations of the various odors to be emitted are arranged so that during actual emission of the odor, the intensity of the smell will be above the threshhold of olfactory sense, while nevertheless the odors are sufficiently evanescent so that when they are no longer replaced by a new supply, the intensity of the scent will within a few seconds fall below the threshhold of the olfactory sense.

Therefore, in the practice of my invention I contemplate providing a multi-cellular battery, each cell of which will contain a different odor. The different cells will be connected in appropriate sequence either by pre-selection or by selection in accordance with specific signals to emit a succession of odors in sequence and in synchronism with the pictures which are brought to view.

Each odor will be emitted for a few seconds to provide the olfactory sensation in synchronism with the visual sensation. If the odor is to last for a substantial period of time, it will be re-emitted. When the visual image changes calling for another synchronized odor, this other synchronized odor will be emitted again for a few seconds and repeated, if necessary, to sustain the odor for the desired length of time. In each case the odor will cease immediately upon cessation of operation of the emitting operation owing to the calculated evanescent quality of the material which emits the odor.

Ordinarily, also owing to the slight pause between odors, a newly emitted odor will overcome any minute residue of a prior odor. Where, however, a prior odor is very strong, one such as the smell of a wood factory while the succeeding odor is a very light one, such as the smell of violets, it may be desirable and my invention contemplates the emission of a neutralizer between the two odors. The neutralizer solution will occupy one or more cells as may be required in the battery and will be connected to the emitting apparatus in synchronism with the visual indications seen by the viewer.

The means above mentioned and hereinafter described of causing the emission of odors will also cause the emission of the neutralizer and the neutralizer, as far as the apparatus is concerned, will be acted upon as if it were another odor. The neutralizer may have a composition which is novel as hereinafter pointed out or may consist of any known material which has the quality of removing foreign particles or odors from the air or neutralizing these foreign particles or odors. The quantity of neutralizer emitted will also be exactly calculated with respect to volume and intensity so that it will have only a minimum effect in removing any existing odor without any prolonged effect with respect to removing subsequent odors.

Thus, the primary object of my invention is the provision of novel odors and neutralizers for utilization in synchronized sequential emission with a series of visually presented images.

Another object of my invention is the provision of novel method for synchronized sequential emission of odors together with sequentially presented moving or still images.

The foregoing and many other objects of my invention will become apparent in the following description and drawings in which:

Figure 1 is a schematic view illustrating one aspect which my novel system may take.

Figure 2 is a top plan view taken from line 2—2 of Figure 1 looking in the direction of the arrows.

Figure 3 is a diagrammatic view showing the cellular structure of the battery of Figure 2.

Figure 4 is a top plan view of the battery of Figure 2 showing a modified construction.

Figure 5 is a diagrammatic view showing the cellular arrangement of the battery of Figure 4.

Figure 6 is a plan view of a film strip showing one manner in which signals may be synchronized with the visually presented images.

Figure 7 is a schematic view of a mixing chamber utilizing a vibrating diaphragm.

Figure 8 is a diagram showing various types of signals for actuating my novel apparatus.

Figure 9 is a diagrammatic view showing the adaptation of my device to a battery of cells which are not necessarily sequentially arranged with respect to the visual images but may nevertheless be selected in a synchronized manner with the visual images.

Figure 10 is a diagrammatic view showing the operation of one of the cells of my novel battery.

Figure 11 shows schematically a modified form of one of the cells of my battery.

As previously mentioned, one of the most important elements of my invention is the utilization of odors which are unfixed or defixed. Secondly, and extremely useful in the operation of my invention, is the standardization of the scents of natural or synthetic origin so that the concentrations thereof will vary in such manner that emission of equal volume for an equal period of time will result in substantially equal levels of olfactory sensation.

Commercially available scents, therefore, because of their persistence would be useless for my novel purposes. These commercial scents or essences are first placed in relatively volatile vehicles such as deodorized ethyl alcohol.

The perfumes are also fixed by fixatives which will survive separation of the essential oil from the vehicle. These fixatives include materials such as Peru balsam, Tolubalsam, benzol and ambra-mask.

The scents are diluted to the degree where the basic scent appears to the nose as agreeable, light, harmonic, in every respect; in case of natural odors, according to nature or corresponding to the purpose.

The perfumes thus would be present in various dilutions according to the intensity and the degree of odor which can be predetermined. All standard odors are based on equal volume, which corresponds to the average or the lightest, hence the weakest concentrations.

From these equalized volumes the thin solutions are defixed: The solutions are run through a filter, diatomaceous earth ($SiO_2$) Terra Silicea, infusorial earth, kieselguhr; these have no smell of their own but eliminate the binding agents. The relation of the scent and diatomaceous earth is 7:8 (the residues are not usable for purposes of scent). The filtrate is largely of reduced persistence since it is largely defixed.

The liquid perfume may now be placed in an appropriate vehicle of solid or liquid form from which the essential odor producing element may be evaporated. The liquid perfumes, before they are brought into solid, plastic form are again concentrated and again become homogeneous.

Example:

| | Percent |
|---|---|
| Wood according to intensity of scent | 4 |
| Cocoa | 1 |
| Roses | 1.5 |
| Peach | 0.2 |
| Honey | 0.1 |
| Coffee | 3 |

According to the purpose for which it is intended, a ten-fold intensification (as determined by the human nose) is indicated.

These concentrated solutions are now added to the vehicle.

20% Bolus alba (an aluminum silicate) (rubra also usable)
5% Kaolin argilla
75% Kieselguhr $SiO_2$ This mixture which has a yellow color, is highly absorptive and thereby absorbs large quantities of liquid. The concentrates are now added to the mixture up to the saturation point. The scent paste may be given any desired shape for the purpose of the cell battery hereinafter described. It is compact, yet permeable, evaporates uniformly and evenly and has the advantage that it continuously also holds back fixatives. Bolus and Kaolin in a certain sense have a conserving effect and prevent the final volatilization (brittleness of mass). It is understood that one does not defix the original concentrates (these have significance only as control samples and for the standardization), but the later concentrates which are ready for use. If the paste is now used too long, i. e., until it is completely dried up, more residues can be held in the solid form—which is something that would be impossible in the liquid form.

For the principle of the solid form by plastic vehicles it is possible for the first time with the same apparatus to change scents in the air or to change them into new odors in a manner similar to that which is achieved when color tones are blended to produce a color different from that of any of the blended materials. For example, the mixture of coffee and vanilla scents will produce the smell of sweetened coffee.

By this means, therefore, a battery of relatively few odors may be used in various combinations of two or more simultaneous odors to produce different odors in many permutations and combinations.

In addition, my device and system may be directed not only to the production of odors in synchronism with visual images but also may be directed to the emission of odors in synchronism with other sensatory material—for instance, a concert received over the radio without any visual images may also be accompanied by synchronized emission of appropriate odors.

Also, a succession of odors may be emitted in either predetermined sequence or in a sequence selected at the time of emission, with the odors not necessarily accompanied by either visual or auditory sensations.

The function of my neutralizer is to remove the odor from the air rather than to attack the olfactory sensation which appears to be the function of most commercial neutralizers.

In addition, it is desirable as previously pointed out to arrange neutralizers in the battery of cells so that they may be emitted at the appropriate time to correct or remove an existing odor prior to the emission of a subsequent odor. The neutralizers essentially have odor destroying properties. Sometimes, however, they may be provided with special additives which will either camouflage the basic smell of the neutralizer providing a relatively neutral masking smell or in a particular case a neutralizer may have a special additive perfume to counteract a specific preceding smell.

Thus, the neutralizer may be used immediately following the emission of a smell in order to affect its intensity or olfactory tone or immediately prior to the emission of a smell in order to clear the air before that smell.

The neutralizers used for this purpose may be emitted in an evaporative vehicle and may include benzaldehyde, hydroquinonedimethylether or metaxyloloxyacetaldehyde hydrate, the latter two being used to mask the initial smell of the neutralizer material. These may be carried in solvents such as glycerine acetate, phthalic ester (ethyl phthalate), or alcohol (ethyl). Another form of neutralizer may include tridecyl aldehyde with amylsalicylate as an additive in solvents as above mentioned. Still another neutralizer may include methylnonylacetic aldehyde with the addition of methylheptenon to mask the smell of the neutralizing ingredient in solvents as above mentioned.

It should be kept in mind, therefore, that for the operation of my invention the battery of cells will include many individual cells having individual odors, these odors being concentrated or diluted so that equal volumes will produce substantially equal olfactory sensations; the various odors will have their fixatives removed either prior to placement in the cell or at the latest just prior to emission from the apparatus; certain of the cells will contain neutralizers either adapted to remove individual odors or adapted generally to remove all odors from the room.

In Figure 1 I have shown schematically one form which a device may take in order to make use of the cell battery. The cell battery 10 is mounted on a rotatable indexing platform 11 which is carried by a rotatable shaft 12. The platform 11 is provided with a plurality of toothed segments 15 which will cooperate with the extending arm 16 of the vertically rotatable shaft 17 in substantially the fashion of a Geneva gear.

A motor 20 is provided which through an appropriate gear train that may be used internally of the motor housing rotates the shaft 17. Shaft 17 carries the extension 16 having element 21 adapted to enter indentations 15a between the teeth 15 extending from platform 11. The method of initiating the operation of the motor 20 will hereinafter be described.

When, however, the motor 20 begins to rotate, member 21 on arm 16 carried by shaft 17 will engage surface 15b of the toothed segments 15 and will rotate the platform 11 and hence the battery 10 by an angular distance corresponding to the angle of rotation of arm 16 during which member 21 engages surface 15b. This angle of rotation will correspond to the angular distance from one cell outlet 25a to the next cell outlet 25b and so on.

During the remainder of the 360° rotation of shaft 17 and arm 16, the platform 11 and the battery 10 will remain stationary. Battery 10 is a multi-cellular container as shown schematically in Figure 3 having a plurality of partitions 30a, 30b, 30c and corresponding outlets 25a, 25b, 25c, etc. The pick-up nozzle 40 hereinafter described is arranged above the battery so that it will not engage any of the openings 25 while the battery is rotating. The operation of motor 20 and arm 16, however, is such that during the initiation of the cycle of rotation of motor 20, the battery will be moved one angular step from, for instance, opening 25d to opening 25e to place the corresponding cell in registry beneath the pick-up nozzle 40.

Instead of a battery such as that shown in Figures 2 and 3, I may have a battery such as that shown in Figures 4 and 5 where a larger number of cells 130 is provided spirally arranged together with the spirally arranged openings 125. The openings 125, although they are spirally arranged, are so placed that equal angular rotation of the battery 10, whatever the position of the pick-up nozzle 140, will move the next angular adjacent outlet 125 exactly into registry with the pick-up nozzle 140. For this purpose it will be noted that as the openings 125 and cells 130 are located closer toward the center, they are placed closer together to provide the same angular distance.

The motor shaft 17 is connected by an appropriate connection 129 to the cam shaft 128 of cam 120 which bears against end 127 of lever 126 mounted on pivot 125a, the opposite end 124 of the lever 126 carrying the pick-up nozzle 140 and its operating apparatus. A tension spring 123 engaging section 124 of lever 126 biases the end 127 of the lever against the surface of cam 120 as the platform 11 is rotated step by step by the motor 20 and arm 16 in connection with the battery of Figures 4 and 5.

The rotation of cam 120 swings the pick-up nozzle 140 inward slowly in accordance with the gear ratio provided for the connection 129 so that the combination of the rotation of the spiral battery 110 with the radial movement of pick-up nozzle 140 produces a scanning of the entire series of spirally arranged outlets. This will be of particular value as hereinafter described in connection with a battery which is prepared to operate on appropriate signal from any sequence of pictures rather than from a predetermined sequence of pictures.

In Figure 10 I have shown one from which each of the cells 30 of my battery may have. A gas tight valve 42 is biased by compression spring 43 up to seal the opening 25. The compression spring 43 may be supported in any suitable manner within the cell 30, and I have shown one method schematically where the spring 43 is supported on a platform 44 secured by extensions (shown in Figure 10) to the container.

The pick-up nozzle 40 as seen in Figure 1 is connected by a hose 50 to a pump 51 which in this case is a vacuum pump. The perfume may be carried either in a liquid or solid body 53 in the cell 30. The pick-up nozzle 40 has an armature 54 which operates within the solenoid coil 55. On energization of the solenoid coil the armature 54 is drawn down pulling down the pick-up nozzle 40. Extension 56 from pick-up nozzle 40 depresses valve 42 while the gasketed mouth 57 of pick-up nozzle 40 seats against the concentric gasket 58 around the opening 25.

The vacuum pump 51 may now draw the volatilized material from the upper portion of chamber 30 passing this material to the manifold 60. Air may enter the upper portion of chamber 30 to permit this vacuum operation to take place through the check valve 62. From the manifold 60 the perfume essence or gases thus drawn down are led through conduits 65, 65 to various parts of the room or theatre.

In Figure 11 I have shown a modification 230 of the cell 30 of Figure 10. In this case, a valve structure in the cell operates in the same manner as that described in connection with Figure 10 and thus has been given the same reference numbers. The pick-up nozzle 40 operates in the same manner. Instead, however, of housing a vacuum pump, a compressor 70 is used forcing air into a manifold 71 and through passages 72 individual to each cell into the longitudinal passage 73 communicating with opening 25 in the solidified mass 153 which carries the perfume. Simultaneously with energization of solenoid 55 to engage the pick-up nozzle 40 of the cell of Figure 11, the electric heating coil 75 is energized in passage 72 so that the air entering through that cell is heated by about 30° C. above the ambient to enhance the evaporative quality of the air.

The pick-up nozzle 40 is connected by hose 50 to a manifold similar to the manifold 60 of Figure 1 and thence to the conduits 65. The use of a heater at the particular cell of Figure 11 which is being actuated as above pointed out increases the rapidity of volatilization while at the same time makes the smell even more rapidly dissipatible owing to the fact that when the gases cool off they contract in volume and, therefore, disappear more readily.

In the sequence of operation, the motor 20 of Figure 1 first rotates the battery 10 by one step, then causes the solenoid 55 to be actuated to engage the pick-up nozzle 40 with the selected cell of the battery 10; it thereafter causes solenoid 55 to be de-energized permitting the spring 80 to raise the pick-up nozzle 40 at which time the battery is prepared for the next step.

With most of the elements now understood, the system of Figure 1 may now be explained in its entirety.

The motion picture film 81 which is moved by known projection operating apparatus over the sprockets 82 and 83 past the image projecting light source 84 is also moved past the light source 85. The film 81 as shown in Figure 6 is provided with a plurality of signals 87, 87 on its margin, which signals for purposes of the present discussion may be similar to each other.

A signal responsive device 88 which may be photosensitive or may operate in any desired manner, including electromagnetically, will pick up the signal 87 from the film 81. The signal that is picked up is passed through an amplifier 90 which receives its power from the power source 91. Amplifier 90 through leads 92, 93 will operate the coil 94 of relay contact 95 to close the circuit to the motor 20 from the power source 91 over the leads 96, 97, 98, 99. This will cause the motor 20 to begin to operate.

The shaft 17a of motor 20 is provided with the switch arm 101 which in the at rest position of the motor engages contact 102. The signal which is received from the film 81 and thereby closes the relay 95 operates as may be well understood momentarily.

As soon as a signal has terminated, the coil 95 of relay 95 will be de-energized and the compression spring 103 will open the relay 95. However, as soon as the motor 20 has begun to rotate, moving contact arm 101 on shaft 17a leaves the stationary contact 102. Stationary contact 102 is in series with relay 105. The contacts of relay 105 are in parallel with relay 95. The coil of relay 105 is energized only when the motor is at the position where its contact arm 101 engages stationary contact 102. Consequently, as soon as the motor begins to rotate to permit the contacts 101 and 102 to separate, relay 105 closes, establishing an alternate parallel circuit to motor 20 around the relay 95, which latter relay opens almost instantaneously.

When the motor 20 completes its 360° cycle of rotation, engagement of contacts 101 and 102 operates relay 105 to open the circuit to motor 20 and the motor 20 comes to a halt. Thus, the single impulses received in the signal receiver device 88 will cause the motor shaft 17 to operate through one 360° cycle. The initiation portion of the cycle of rotation will through arm 16 cause the battery 10 to rotate by the angular distance between two adjacent openings 25 or 125 (Figures 2, 3, 4 and 5).

When the arm 16 leaves the section 15b of the segments 15 which it has engaged in order to effect this angular movement, then an opening 25 is in registry with the pick-up nozzle 40. At this time engagement of contact arm 101 on shaft 17a with contact segment 108 will close the circuit over leads 109 and 110 to the pick-up nozzle solenoid 55 to cause the pick-up nozzle 40 to engage the opening 25 as described in connection with Figures 10 and 11.

When during the cycle of operation of motor shaft 17—17a contact arm 101 leaves the segment 108, solenoid 55 of the pick-up nozzle 40 will be de-energized, pick-up nozzle 40 will be raised by spring 80 and the shaft 17 will rotate until the arm 16 is adjacent a side 15b of one of the teeth 15 of platform 11.

At this time contact arm 101 and contact 102 will be engaged to open relay 105 and de-energize the motor 20, and the unit will be ready for the next signal.

Where a motion picture is prepared for synchronization with say 25 different occurrences of 15 different smells, then successive cells will be arranged in sequence with the successive motion picture scenes and certain of the cells in the appropriate sequential order will duplicate earlier smells.

Assuming that three of the smells will be very strong and will be followed rapidly by other smells, then there will be at least three cells with neutralizers. Assuming, therefore, that the 10th, 15th and 20th odor sequences will be a rose garden, then the 10th, 15th and 20th odor cells of the battery will have the rose perfume. If a neutralizer is thought to be necessary immediately following or immediately preceding a certain smell, then there will be a separate cell for that neutralizer and a signal for operating the neutralizer exactly similar to the signal for operating the emission of a smell and in the appropriate sequence.

Thus, although there will only be 15 smells and one neutralizer, since the certain smells will be repeated there will be 25 cells of perfume interspersed at the appropriate points with three cells for neutralizer or 28 cells in all for that particular battery.

The particular signal on the film 81 will be identical for each cell since in the system I have thus far described the purpose of the signal is simply to advance the battery to the next sequential element and cause emission therefrom. Selection in a rambling order from the battery is not provided for by the system as thus far described.

I have previously in connection with Figure 1 referred to a vacuum pump 51 for drawing out the odor and in connection with Figure 11 have referred to a pressure device 70 for forcing out the odor. In Figure 7 I have shown schematically a device which may be used either alone or in connection with a vacuum pump or compressor for mixing and forcing out the odors.

Where the area to be covered is relatively very small, then the device of Figure 7 may be used. Essentially the device of Figure 7 is a high speed mixing and combination pressure and vacuum pump for moving small volumes. In the use of the device of Figure 7 the pick-up nozzle 40 will be connected by a hose 250 to the intake 251 of chamber 252. A check valve 253 is provided at the intake to prevent reverse flow of the gases. A check valve 254 is also provided for chamber 252 permitting air to be drawn in by the process hereinafter described to mix with the gases. A membrane 256 is mounted at one side of chamber 252 and forms a partition between the chamber 252 and the chamber 260. The membrane is vibrated in any suitable manner at a desired frequency, say of the order of 60 to 200 cycles per second, by a loud speaker type of coil 257 operating in connection with a permanent magnet 258, or it may be vibrated in any other suitable manner.

The passage 265 is provided between chambers 252 and 260, this passage being provided with the check valve 266 to prevent reverse flow from chamber 260 back to chamber 252. A control valve 270 is provided in the passage 265 and may be opened by the operation of solenoid coil 271. When the pick-up nozzle 40 is in registry with the cell and connected by hose 250 to input 251, the membrane 256 may be vibrated and the valve 270 may be opened.

Each movement of the membrane 250 toward the right will create a slight reduction in pressure permitting the gas to be drawn up through intake 251 and permitting the gases to be mixed with air drawn in through check valve 254. Each movement toward the left of membrane 256 will close the check valves 253 and 254 and force some portion of the gas through passage 265 and past check valve 266 into chamber 260. Subsequent movement to the right of membrane 256 will expel some of the gases in chamber 260 through the nozzle 270 while at the same time it will draw in more perfume and air into chamber 252.

The rapid succession of vibrations of membrane 256 will thus perform a mixing function in chamber 252, a pumping function from chamber 252 into chamber 260 and a pumping function from chamber 260 out through nozzle 270. A filter 272 in chamber 260 adjacent the nozzle 270 will remove undesired material such as the vehicle and any remaining fixative from the perfume.

By this means, therefore, a small size highly effective mixer and expeller may be made for utilization with small volumes of perfume in relatively small areas.

Primarily, as above pointed out, this present disclosure relates to the application of my invention to emission of odors in predetermined sequence so that a single signal repeated a desired number of times will cause the desired sequential number of odor emissions to take place.

In Figures 8 and 9 I have shown very schematically one modification of my invention in which the device may be arranged so that the selection of odors will not depend on the initial sequential arrangement of odors for each succession of pictures in the battery but rather wherein odors chosen in random sequence may be emitted.

In this modification of my invention, the film strip or other media for causing pictures to be exhibited will at the desired point generate signals 300, 301, 302, 303, 304 (Figure 8) of differing frequency. That is, a signal of frequency 302 will always represent a rose perfume and a signal of frequency 304 will always represent tobacco smoke and so on.

The battery 310 is mounted on its platform 311 which in turn is mounted on shaft 312. The shaft 312 is provided with a spring member 313 which will always return the battery 310 back to a starting position. The platform 311 is provided with an extension 314 which engages the stop 315 at the predetermined starting position.

When a smell signal is received, it will initiate the operation of a motor to drive the shaft 312 in a clockwise direction. At the same time, the frequency of the signal going through amplifier 320 and the series of filters 321 will operate an appropriate solenoid coil 322 connected to the particular filter to cause the stop 324 to move into the path of the member 314. The frequency of the signal which will thus cause the signal to pass only through the selected filter will operate only the selected solenoid coil 322 to operate only the selected stop member 324 into the path of stop 314.

The motor will, therefore, operate until the member 314 engages the selected stop 324. The selected stop 324 will correspond to the desired odor and hence the cell of the battery at that angular position will contain the desired odor. The continued operation of the motor will then be used to operate the smell emission in the manner previously described, an appropriate friction clutch being arranged between the motor and shaft 312 to hold it or latch it against the selected stop 324 until the motor has finished its rotation through its own full cycle, and thereafter the spring 313 may cause a return of the entire battery 310 to its initial position.

Thus, in the operation of my smell emission device where a particular motion picture is made, it is thereafter cued by appropriate signals for the appropriate odor emissions and a battery is made for each print which is to be shown, the said battery containing the various smells in the desired sequence so that the same signal whenever it is repeated will produce the next sequential odor or neutralizer as required.

The film exhibitor will at the same time he obtains the can of film for exhibition also obtain a battery for insertion in the odor projecting device. He will return the can of film together with the battery when the series of exhibitions is completed at his theatre and will receive a new sequentially arranged battery which will cooperate with desired cue signals on another film.

Where in the progress of the utilization of my device the batteries are desired to be cued not to the specific film but rather to be arranged either for motion picture or television cuing so that odors may be selected from standard batteries which are always maintained at the place of exhibition, then the pictures which are exhibited will be cued, as above pointed out, to the desired odor by signals of distinctive frequency or signals of distinctive amplitude or signals of distinctive length.

In the schematic showing of Figure 1 I have shown only those elements essential to a comprehension of the principle of operation of my invention. Thus, the stepping switch 101—102—108 has been shown as having only a single moving arm and one stationary contact with one slip ring contact. Actually, in the operation of the device itself there may be as many as fifteen separate contacts to be engaged by moving contact 101 over the single cycle turning various pumps or other elements on or off, turning solenoid coils and valve elements on or off, and controlling the opening and closing of conduits.

It is felt that for a full understanding of the principle of the device, however, the schematic showing will be sufficient for the present purposes.

In addition, the contacts may be arranged to be engaged with each other and disengaged by movement of shaft 17a with shaft 17a merely operating a cam member or plurality of cam members to achieve the desired result.

Various other modifications and amplifications will now be obvious to those skilled in the art. I, therefore, prefer to be bound not by the specific disclosures herein contained but only by the appended claims.

I claim:

1. The process of emitting odors into an area in sequence and in synchronism with visual indicia comprising the steps of selectively absorbing a substantial portion of fixative from odor carrying material; passing said defixed odor carrying material into a plurality of cells; transmitting material from each cell in predetermined sequence into said area in response to indicia connected with said visual indicia.

2. The process of emitting odors into an area in sequence and in synchronism with visual indicia comprising the steps of preparing a plurality of cells with odor carrying material free of fixative and transmitting said material in predetermined sequence from each selected cell into said area in response to indicia connected with said visual indicia.

3. The process of preparing odor carrying materials for emission into an area in predetermined sequence to produce odors of predetermined duration comprising the steps of adjusting each odor carrying material to a concentration in which equal volumes of each of said materials will produce different odors of substantially equal effect on the olfactory sense and selectively absorbing at least a portion of the fixative from the odor carrying material.

4. The process of emitting odors into an area in sequence and in synchronism with visual indicia comprising the steps of adjusting each odor carrying material to a concentration in which equal volumes of different material will produce different odors of substantially equal effect on the olfactory sense and filtering said odor carrying materials through a fixative removing filter and removing a substantial portion of fixative where present in each such odor carrying material, preparing a plurality of cells with said filtered odor carrying material; and transmitting material from each cell in predetermined sequence into said area in response to indicia connected with said visual indicia.

5. The process of emitting odors into an area in sequence and in synchronism with visual indicia comprising the steps of selectively absorbing at least a portion of the fixative from various odor-carrying materials, discharging the resulting relatively fixative-free materials into said area in predetermined sequence, and between the discharge of each portion of said odor-carrying material emitting in the said area a substance which will neutralize the impression of the preceding odor on the olfactory sense.

6. The process of emitting odors into an area in sequence and in synchronism with visual indicia comprising the steps of selectively absorbing from odor-carrying materials at least a portion of the fixative contained therein by contact with an adsorbent from the group consisting of diatomaceous earth, silica, infusorial earth, and kieselguhr, discharging the resulting relatively fixative-free materials into said area in predetermined sequence and between the discharge of each portion of said odor-carrying material, emitting in the said area a substance which will neutralize the impression of the preceding odor on the olfactory sense, said neutralizer containing a compound from the group consisting of benzaldehyde, methylnonylacetic aldehyde and tridecyl aldehyde.

7. The method of claim 6 in which the ratio of odor-carrying material to adsorbent is of the order of 7 to 8.

(References on following page)

References Cited in the file of this patent

UNITED STATES PATENTS

| | | |
|---|---|---|
| 1,171,561 | Templin | Feb. 15, 1916 |
| 1,310,511 | Summers | July 22, 1919 |
| 1,749,187 | Leavell | Mar. 4, 1930 |
| 1,786,630 | Reid | Dec. 30, 1930 |
| 1,847,233 | Bilde | Mar. 1, 1932 |
| 2,144,190 | Merz | Jan. 17, 1939 |
| 2,258,132 | Carpenter | Oct. 7, 1941 |
| 2,527,029 | Paschal | Oct. 24, 1950 |
| 2,540,144 | Stern | Feb. 6, 1951 |
| 2,552,261 | Coughlin | May 8, 1951 |
| 2,562,959 | Stern | Aug. 7, 1951 |
| 2,562,960 | Stern | Aug. 7, 1951 |